(12) United States Patent
Finkle et al.

(10) Patent No.: US 8,072,108 B2
(45) Date of Patent: Dec. 6, 2011

(54) ELECTRIC MOTOR OR GENERATOR WITH MECHANICALLY TUNEABLE PERMANENT MAGNETIC FIELD

(76) Inventors: Louis J. Finkle, Lakewood, CA (US); Andrea Furia, Downey, CA (US)

( * ) Notice: Subject to any disclaimer, the term of this patent is extended or adjusted under 35 U.S.C. 154(b) by 0 days.

(21) Appl. No.: 12/905,834

(22) Filed: Oct. 15, 2010

(65) Prior Publication Data
US 2011/0101815 A1    May 5, 2011

Related U.S. Application Data

(63) Continuation-in-part of application No. 12/610,271, filed on Oct. 30, 2009, and a continuation-in-part of application No. 12/610,184, filed on Oct. 30, 2009.

(51) Int. Cl.
*H02K 21/12* (2006.01)
(52) U.S. Cl. ............... 310/156.24; 310/156.38
(58) Field of Classification Search ............. 310/156.24, 310/156.36–156.38, 156.43, 156.48, 191, 310/209
See application file for complete search history.

(56) References Cited

U.S. PATENT DOCUMENTS

| | | | |
|---|---|---|---|
| 2,209,558 A | 7/1940 | Bing et al. | |
| 2,243,616 A * | 5/1941 | Bing et al. | 335/295 |
| 2,287,286 A | 6/1942 | Bing et al. | |
| 2,558,540 A | 6/1951 | Clos | |
| 4,151,431 A | 4/1979 | Johnson | |
| 4,482,034 A * | 11/1984 | Baermann | 188/165 |
| 4,508,998 A | 4/1985 | Hahn | |
| 4,578,609 A * | 3/1986 | McCarty | 310/156.24 |
| 5,166,654 A * | 11/1992 | Doyelle | 335/288 |
| 5,594,289 A | 1/1997 | Minato | |
| 6,376,959 B1 * | 4/2002 | Leupold | 310/166 |
| 6,771,000 B2 * | 8/2004 | Kim et al. | 310/209 |
| 6,864,773 B2 * | 3/2005 | Perrin | 335/306 |
| 7,567,004 B2 * | 7/2009 | Smith | 310/156.33 |
| 2004/0041481 A1 | 3/2004 | Kuo | |
| 2006/0038457 A1 | 2/2006 | Miyata et al. | |
| 2007/0228856 A1 | 10/2007 | Bates et al. | |

FOREIGN PATENT DOCUMENTS
JP          62-117558      11/1988
WO          WO 88/05976     8/1988
* cited by examiner

*Primary Examiner* — Dang D Le
(74) *Attorney, Agent, or Firm* — Kenneth L. Green

(57) ABSTRACT

Apparatus and method for tuning the magnetic field of brushless motors and alternators to obtain efficient operation over a broad RPM range. The motor or alternator includes fixed windings (or stator) around a rotating rotor carrying permanent magnets. The permanent magnets are generally cylindrical and have North and South poles formed longitudinally in the magnets. Magnetically conducting circuits are formed by the magnets residing in magnetic conducting pole pieces (for example, low carbon or soft steel, and/or laminated insulated layers, of non-magnetizable material). Rotating the permanent magnets, or rotating non-magnetically conducting shunting pieces, inside the pole pieces, either strengthens or weakens the resulting magnetic field to adjust the motor or alternator for low RPM torque or for efficient high RPM efficiency. Varying the rotor magnetic field adjusts the voltage output of the alternators allowing, for example, a windmill generator, to maintain a fixed voltage output.

26 Claims, 14 Drawing Sheets

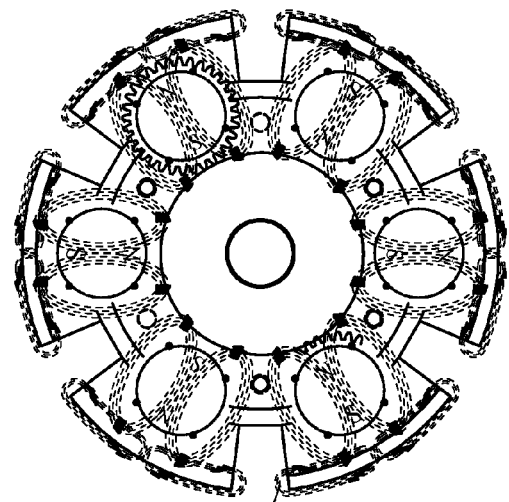
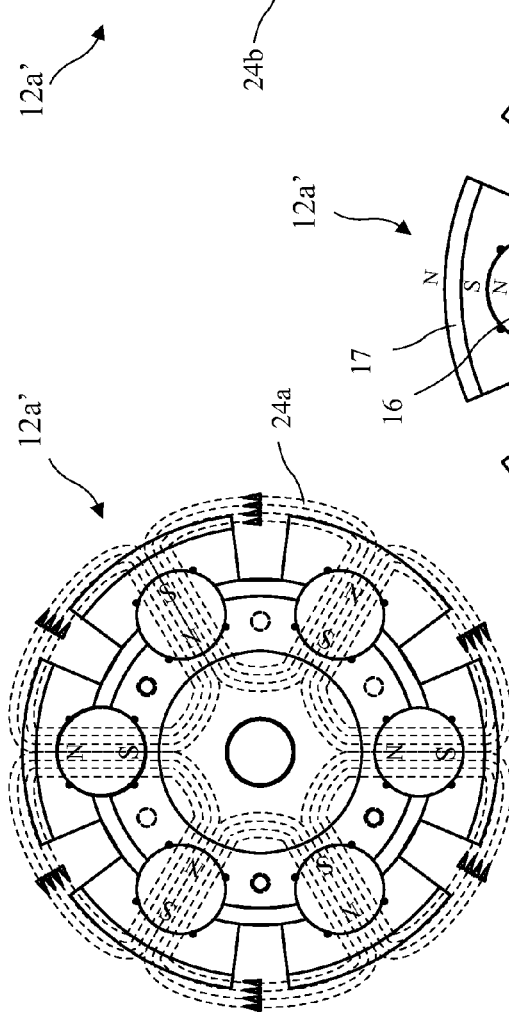
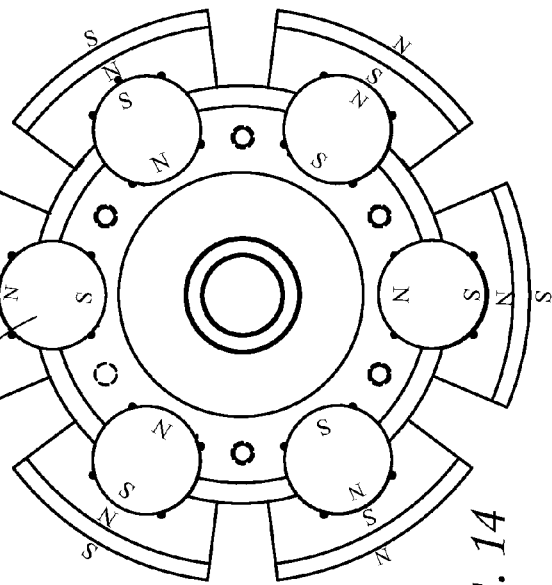
FIG. 15B
FIG. 15A
FIG. 14

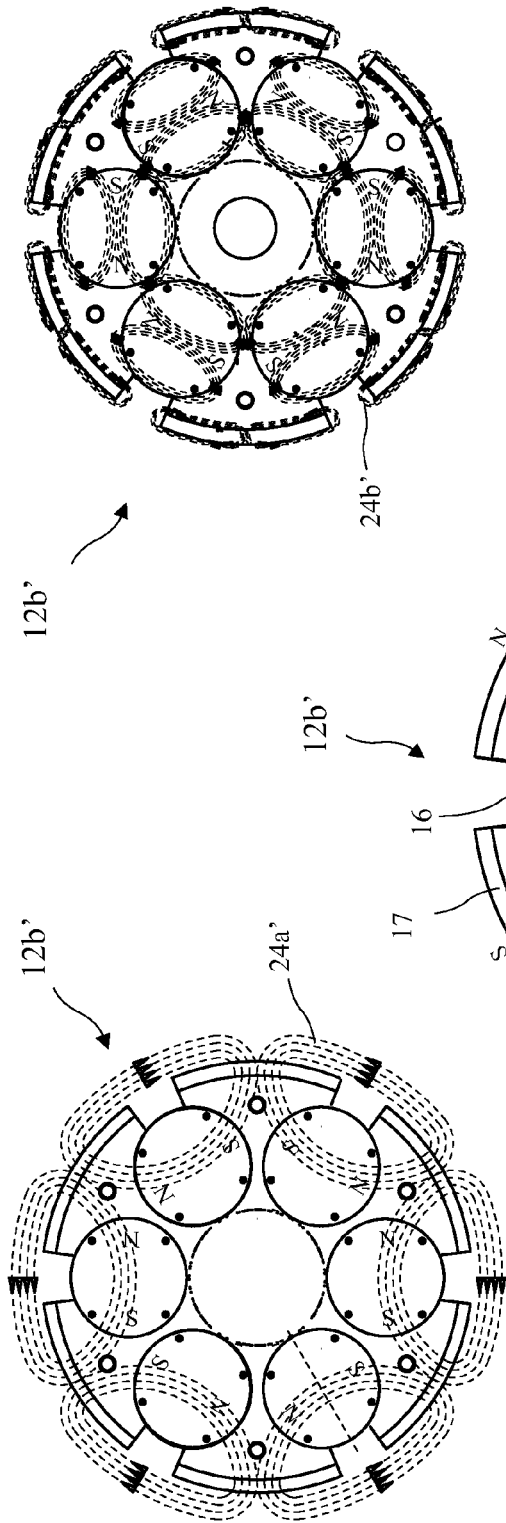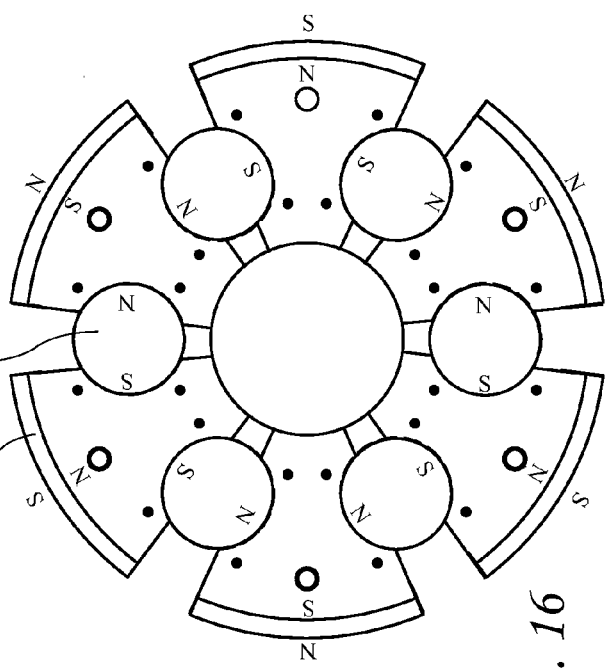
FIG. 17B
FIG. 17A
FIG. 16

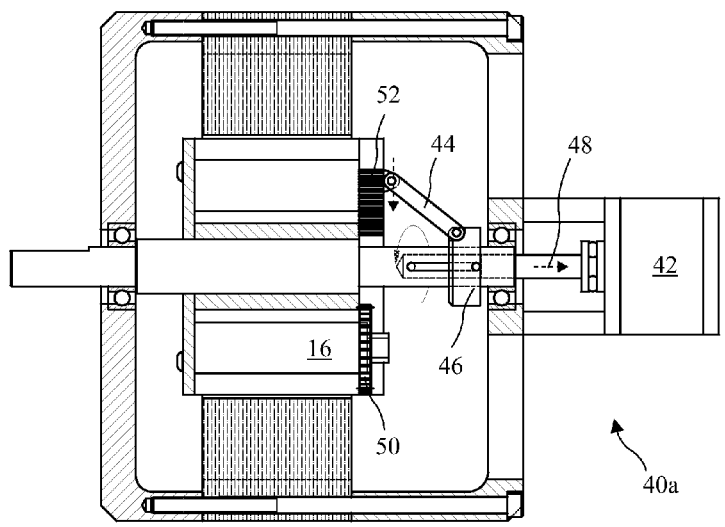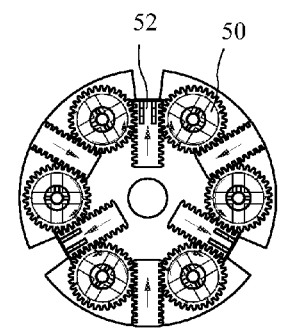
FIG. 19A
FIG. 19B
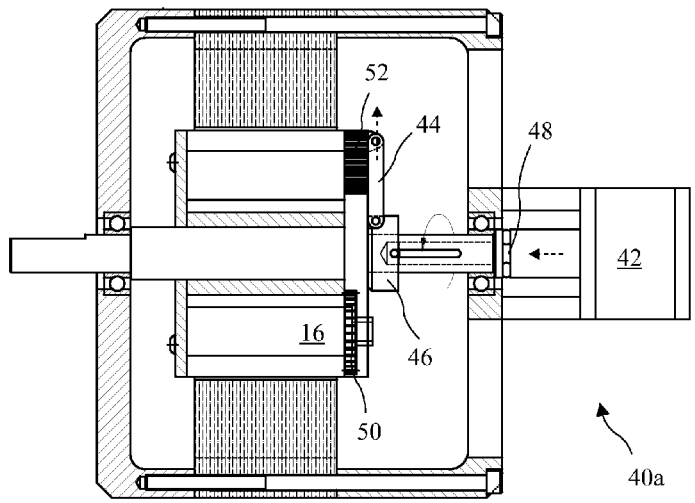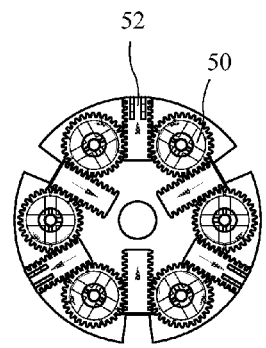
FIG. 20A
FIG. 20B

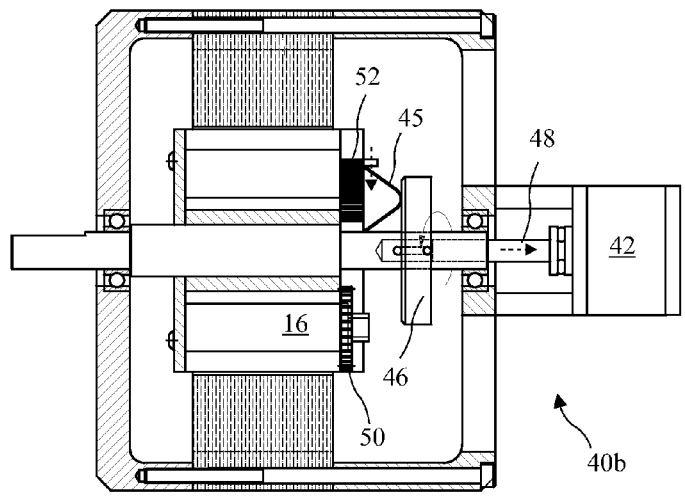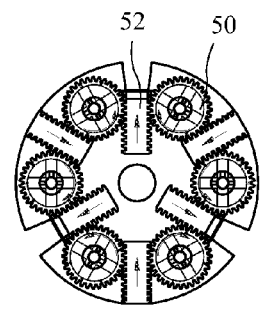
FIG. 21A
FIG. 21B
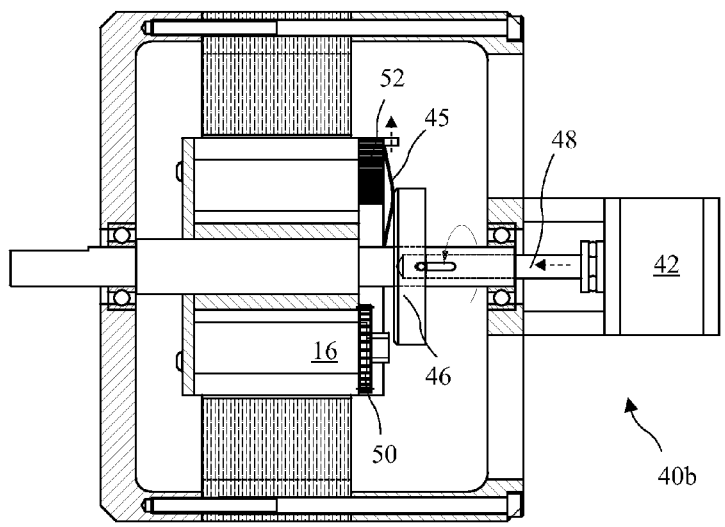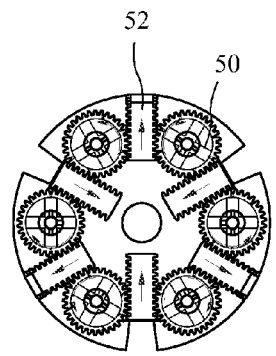
FIG. 22A
FIG. 22B

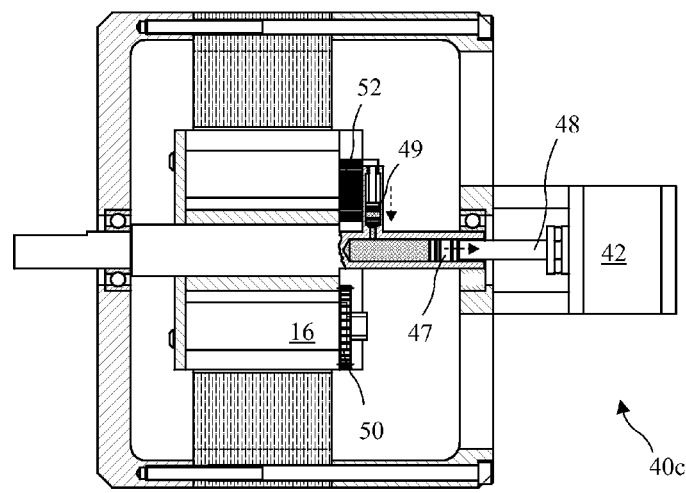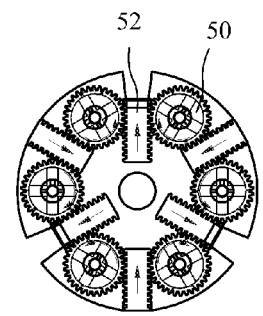
FIG. 23A
FIG. 23B
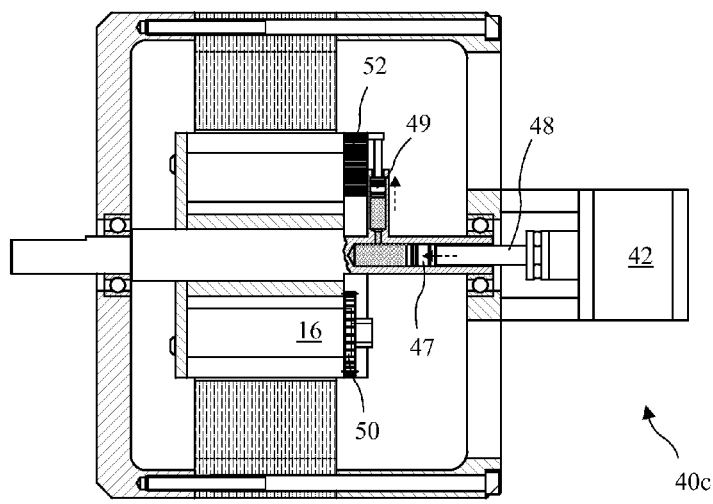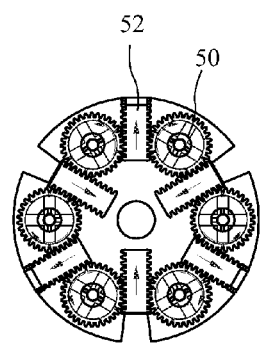
FIG. 24A
FIG. 24B

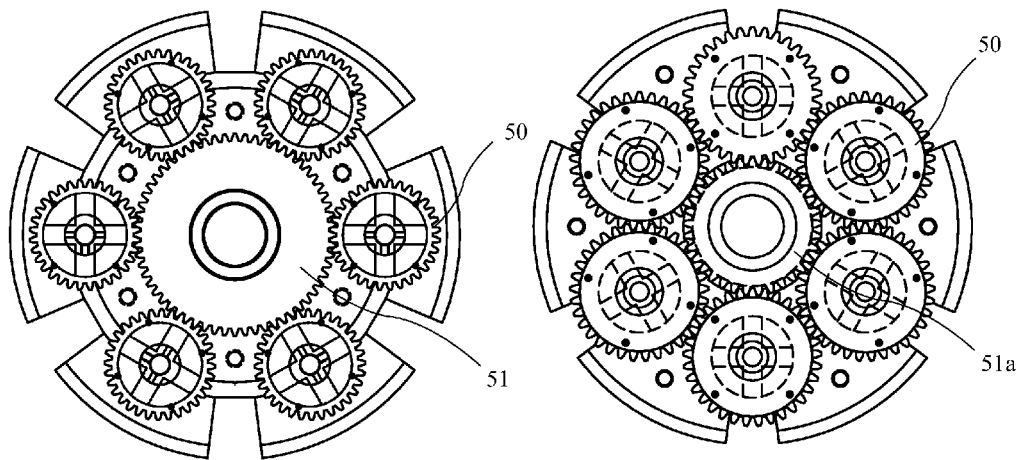
FIG. 25A                    FIG. 25B
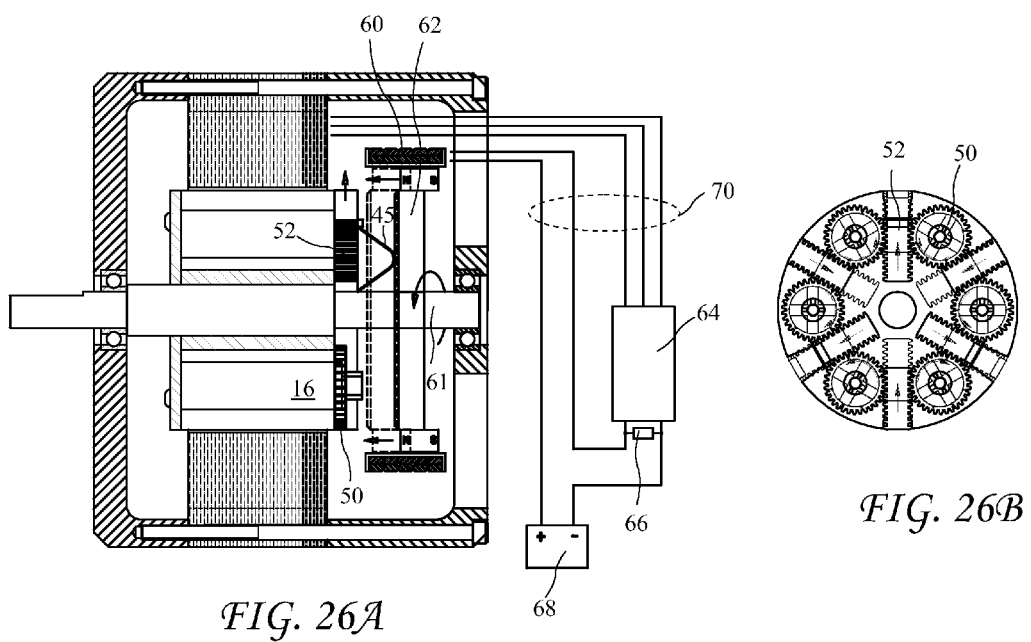
FIG. 26A                    FIG. 26B

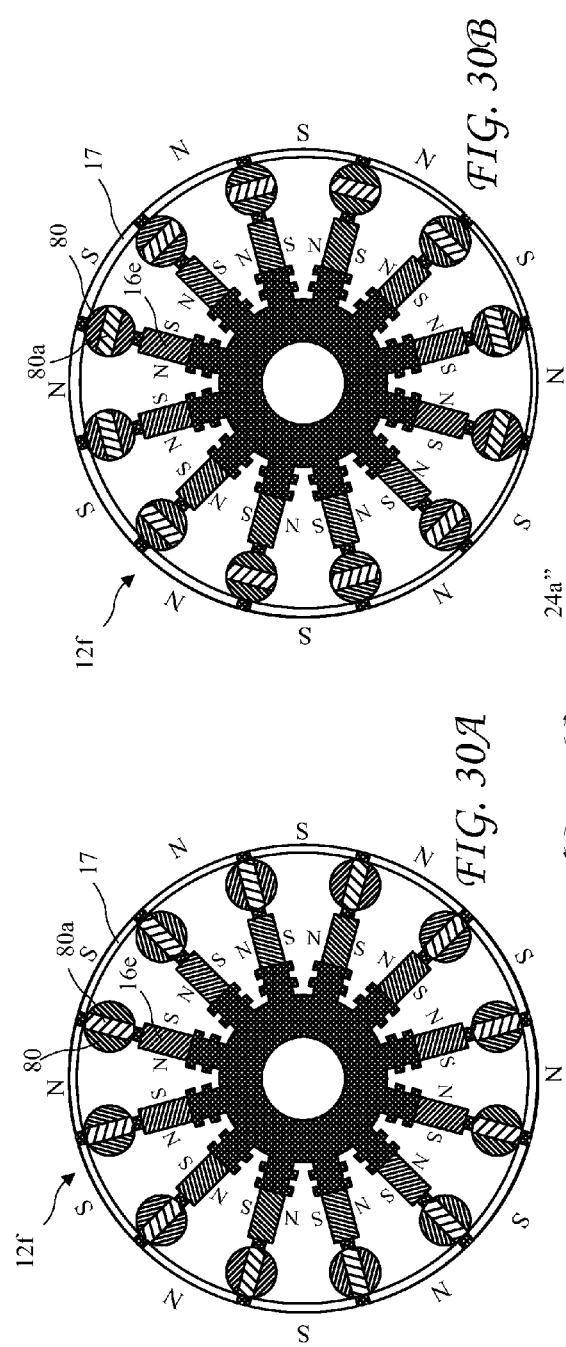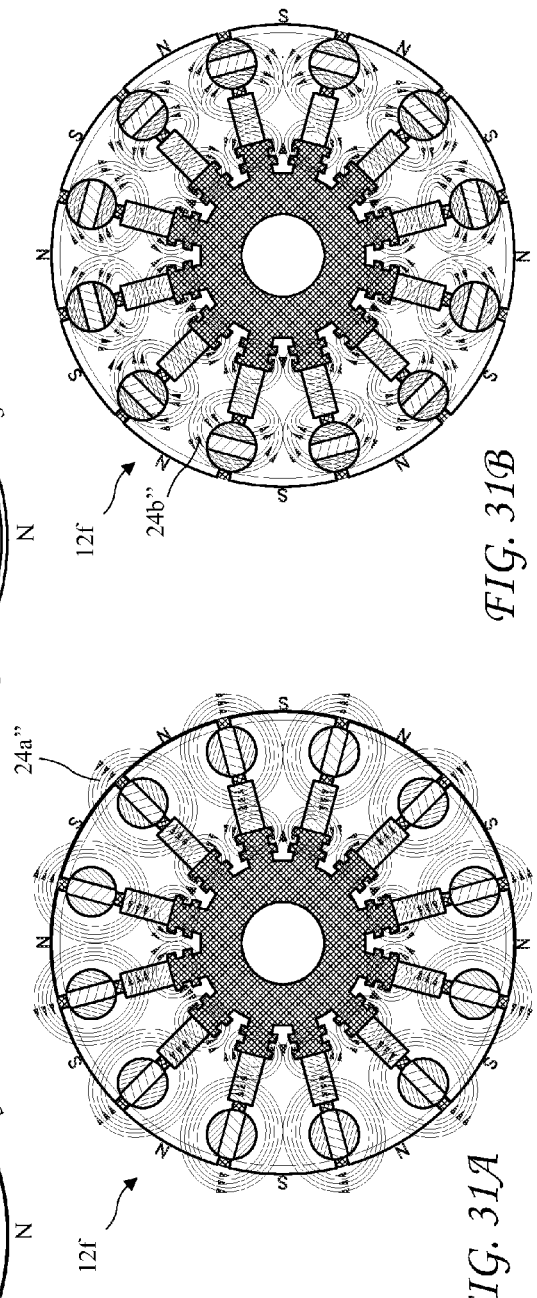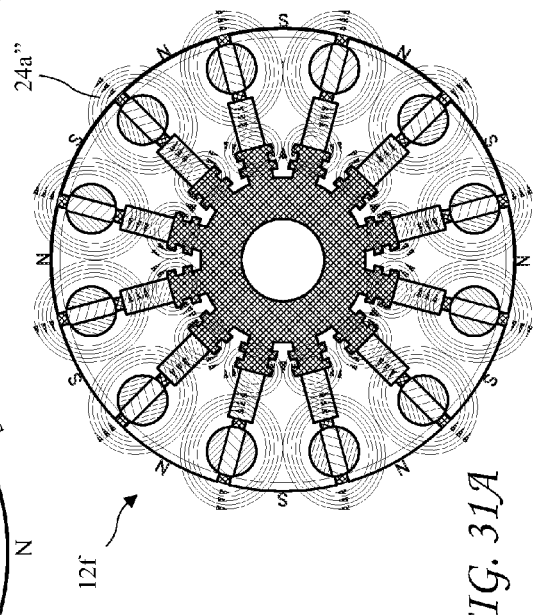

ELECTRIC MOTOR OR GENERATOR WITH MECHANICALLY TUNEABLE PERMANENT MAGNETIC FIELD

The present application is a continuation in part of U.S. patent application Ser. No. 12/610,184 filed Oct. 30, 2009, and of U.S. patent application Ser. No. 12/610,271 filed Oct. 30, 2009, which applications are incorporated in their entirety herein by reference.

BACKGROUND OF THE INVENTION

The present invention relates to electric motors and generators and in particular to adjusting the orientation of fixed magnets and/or non-magnetic shunting piece in a rotor to obtain efficient operation at various RPM.

Brushless DC motors are often required to operate at various RPM but can only achieve efficient operation over a limited RPM range. Further, generators and alternators are often required to operate over a broad RPM range. For example, automotive alternators operate at an RPM proportional to engine RPM and windmill alternators operate at an RPM proportional to wind speed. Unfortunately, known alternators generate electricity at a voltage proportion to RPM. Because RPM cannot be easily controlled, other elements are often required to adjust the output voltage, adding inefficiency, complexity, and cost to the alternator systems.

Some designs have attempted to broaden RPM range using "field weakening" to allow the motor to be efficient at very low RPM, and still obtain efficient higher RPM operation. Such field weakening can be applied to Interior Permanent Magnet Synchronous Motors (IPMSM) or AC synchronous induction motors, allowing three to four times base speed (RPM) with reasonable efficiency. Unfortunately, field weakening with conventional methods can sacrifice efficiency at higher RPM and increases the complexity of controller algorithms and software.

In a generator/alternator application, the output voltage is proportional to magnetic flux strength requiring an inverter or separate electromagnetic exciter coil in automotive alternators that are only 60-70 percent efficient because of the very wide RPM range the alternators must operate over. Similar issues are present in wind power generation where variations in wind speed encountered resulting in operating inefficiencies.

BRIEF SUMMARY OF THE INVENTION

The present invention addresses the above and other needs by providing apparatus and method for tuning the magnetic field of brushless motors and alternators to obtain efficient operation over a broad RPM range. The motor or alternator includes fixed windings (or stator) around a rotating rotor carrying permanent magnets. The permanent magnets are generally cylindrical and have North (N) and South (S) poles formed longitudinally in the magnets. Magnetically conducting circuits are formed by the magnets residing in magnetic conducting pole pieces (for example, low carbon or soft steel, and/or laminated insulated layers, of non-magnetic material). Rotating the permanent magnets, or rotating non-magnetic shunting pieces, inside the pole pieces, either strengthens or weakens the resulting magnetic field to adjust the motor or alternator for low RPM torque or for efficient high RPM efficiency. Varying the rotor magnetic field adjusts the voltage output of the alternators allowing, for example, a windmill generator, to maintain a fixed voltage output. Other material used in the rotor is generally non-magnetic, for example, stainless steel.

In accordance with one aspect of the present invention, there are provided apparatus and methods to vary the flux strength of rotor/armature in an electric motor to provide improved starting torque and high RPM efficiency.

In accordance with another aspect of the present invention, there are provided apparatus and methods to vary the magnetic flux strength of rotor/armature in generator/alternator applications to control output voltage independent of RPM. Many known alternator applications cannot control alternator RPM, for example, automotive alternators which must operate at an RPM proportional to engine RPM and wind power generation which are subject to wind speed. Varying the magnetic flux strength of rotor/armature allows output voltage to be controlled independently of RPM thereby eliminating the need for an inverter or separate electromagnetic exciter coil.

In accordance with yet another aspect of the present invention, there are provided apparatus and methods to vary the magnetic field of a motor or generator by rotating half length cylindrical permanent magnets to align or miss-align the rotatable magnets with fixed half length permanent magnets.

In accordance with another aspect of the present invention, there are provided apparatus and methods to vary the magnetic field of a motor or generator by rotating magnetic shunting pieces in cooperation with fixed permanent magnets.

In accordance with still another aspect of the present invention, there are provided apparatus and methods adaptable to vary the magnetic field of a motor suitable for application to an induction motor to provide a weak magnetic field for starting the motor in an asynchronous mode and to provide a strong magnetic field for efficient operation in a synchronous mode.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 14 is an end view of a hybrid tunable permanent internal magnet and fixed external magnet rotor, in the radially aligned configuration, with the internal magnets aligned for maximum flux, according to the present invention.

FIG. 15A is an end view of the hybrid tunable permanent internal magnet and fixed external magnet rotor, in the radially aligned configuration, tuned for a maximum magnetic field according to the present invention.

FIG. 15B is an end view of the hybrid tunable permanent internal magnet and fixed external magnet rotor, in the radially aligned configuration, tuned for a minimum magnetic field according to the present invention.

FIG. 16 is an end view of a hybrid tunable permanent internal magnet and fixed external magnet rotor, in the flux squeeze configuration, according to the present invention.

FIG. 17A is an end view of the hybrid tunable permanent internal magnet and fixed external magnet rotor, in the flux squeeze configuration, tuned for a maximum magnetic field according to the present invention.

FIG. 17B is an end view of the hybrid tunable permanent internal magnet and fixed external magnet rotor, in the flux squeeze configuration, tuned for a minimum magnetic field according to the present invention.

FIG. 19A is a side view of a first embodiment of apparatus for adjusting the cylindrical two pole permanent magnets in a first magnet position.

FIG. 19B is an end view of the first embodiment of apparatus for adjusting the cylindrical two pole permanent magnets in the first magnet position.

FIG. 20A is a side view of the first embodiment of apparatus for adjusting the cylindrical two pole permanent magnets in a second magnet position.

FIG. 20B is an end view of the first embodiment of apparatus for adjusting the cylindrical two pole permanent magnets in the second magnet position.

FIG. 21A is a side view of a second embodiment of apparatus for adjusting the cylindrical two pole permanent magnets in a first magnet position.

FIG. 21B is an end view of the second embodiment of apparatus for adjusting the cylindrical two pole permanent magnets in the first magnet position.

FIG. 22A is a side view of the second embodiment of apparatus for adjusting the cylindrical two pole permanent magnets in a second magnet position.

FIG. 22B is an end view of the second embodiment of apparatus for adjusting the cylindrical two pole permanent magnets in the second magnet position.

FIG. 23A is a side view of a third embodiment of apparatus for adjusting the cylindrical two pole permanent magnets in a first magnet position.

FIG. 23B is an end view of the third embodiment of apparatus for adjusting the cylindrical two pole permanent magnets in the first magnet position.

FIG. 24A is a side view of the third embodiment of apparatus for adjusting the cylindrical two pole permanent magnets in a second magnet position.

FIG. 24B is an end view of the third embodiment of apparatus for adjusting the cylindrical two pole permanent magnets in the second magnet position.

FIG. 25A is an alternative gear apparatus for adjusting the positions of the cylindrical two pole internal permanent magnets of the hybrid tunable permanent internal magnet and fixed external magnet rotor, in the radially aligned configuration, according to the present invention.

FIG. 25B is an alternative gear apparatus for adjusting the positions of the cylindrical two pole internal permanent magnets of the hybrid tunable permanent internal magnet and fixed external magnet rotor, in the flux squeeze configuration, according to the present invention.

FIG. 26A is a side view of a biasing system for controlling magnet positions for a motor according to the present invention.

FIG. 26B is an end view of the biasing system for controlling magnet positions for a motor according to the present invention.

FIG. 30A is an end view of a tunable permanent magnet rotor according to the present invention, having moveable magnetic shunting pieces aligned to provide a strong magnetic field.

FIG. 30B is an end view of the tunable permanent magnet rotor according to the present invention, having the moveable magnetic shunting pieces misaligned to provide a weak magnetic field.

FIG. 31A is an end view of the tunable permanent magnet rotor according to the present invention, showing the strong magnetic field obtained by having the moveable magnetic shunting pieces aligned.

FIG. 31B is an end view of the tunable permanent magnet rotor according to the present invention, showing the weak magnetic field obtained by having the moveable magnetic shunting pieces misaligned.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Figure 1A:
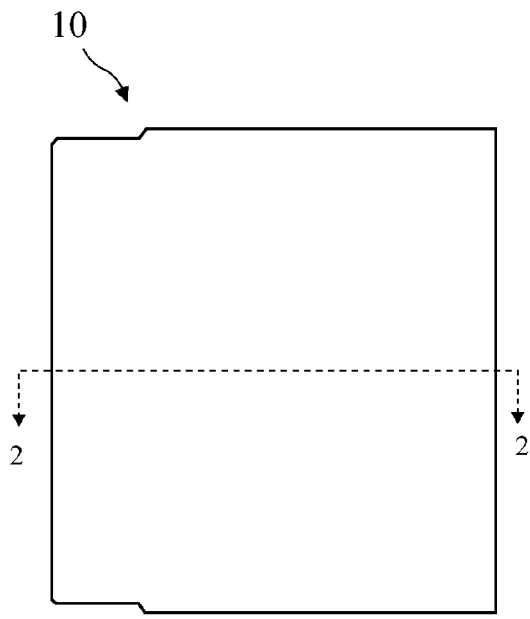
FIG. 1A is a side view of a reconfigurable electric motor according to the present invention.
Figure 1B:
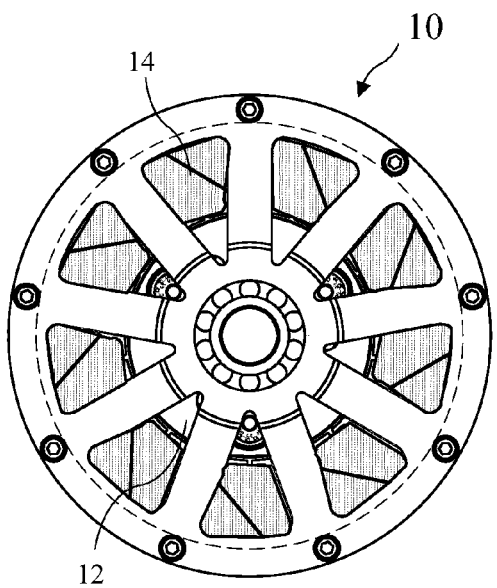
FIG. 1B is an end view of the reconfigurable electric motor according to the present invention.
Figure 2:
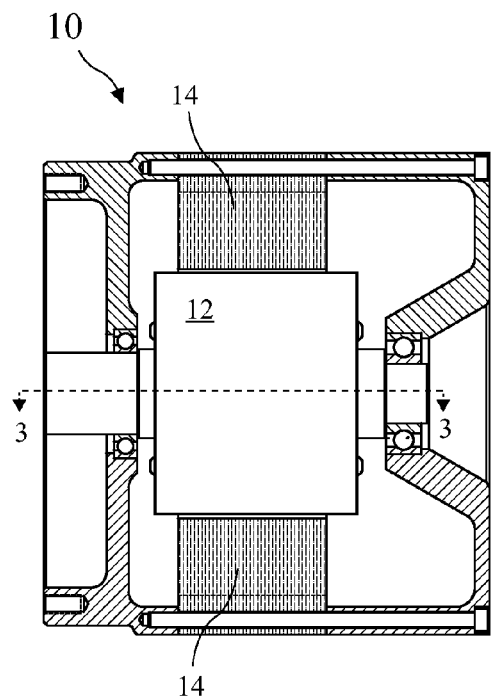
FIG. 2 is a cross-sectional view of the reconfigurable electric motor according to the present invention taken along line 2-2 of FIG. 1A.

A side view of a reconfigurable electric motor 10 according to the present invention is shown in FIG. 1A, an end view of the reconfigurable electric motor 10 is shown in FIG. 1B, and a cross-sectional view of the reconfigurable electric motor 10 taken along line 2-2 of FIG. 1A is shown in FIG. 2. The motor 10 includes stator windings 14 and a rotor 12 residing inside the stator windings 14. The motor 10 is a brushless AC inductive motor including a magnetic circuit including at least one permanent magnet 16 (see FIGS. 3-7) or moveable magnetic shunting pieces 80 (see FIGS. 30A and 30B) in the rotor 12, which magnets 16 or magnetic shunting pieces 80 may be adjusted to control the rotor's magnetic field over a range of RPM for efficient operation.

Figure 3:
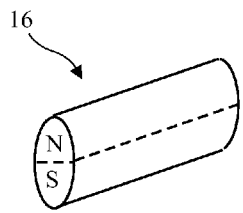
FIG. 3 is a perspective view of a cylindrical two pole permanent magnet according to the present invention.
Figure 4:
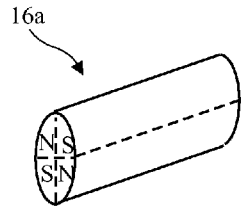
FIG. 4 is a perspective view of a cylindrical four pole permanent magnet according to the present invention.

A perspective view of a cylindrical two pole permanent magnet 16 according to the present invention is shown in FIG. 3 and a perspective view of a cylindrical four pole permanent magnet 16a according to the present invention is shown in FIG. 4. The poles of the magnet 16 and 16a run the lengths of the magnets as indicated by dashed lines.

Figure 5A:
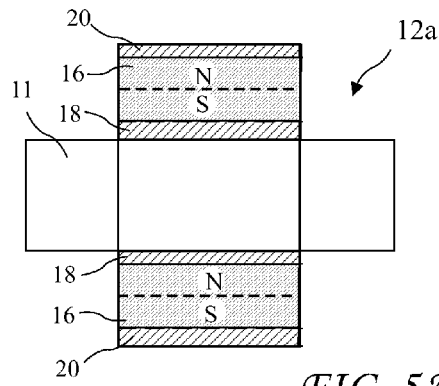
FIG. 5A is a side view of a tunable permanent magnet rotor according to the present invention, in a radially aligned configuration.
Figure 5B:
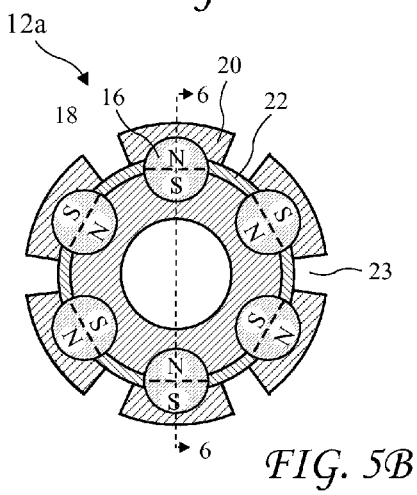
FIG. 5B is an end view of the tunable permanent magnet rotor according to the present invention, in the radially aligned configuration.

A side view of a tunable permanent magnet rotor 12a according to the present invention, in a radially aligned configuration, is shown in FIG. 5A and an end view of the tunable permanent magnet rotor 12a, in the radially aligned configuration, is shown in FIG. 5B. The rotor 12a includes the magnets 16, an inner pole piece 18, outer pole pieces 20, and non-magnetic spacer 22. The pole pieces are a magnetically conducting but non-magnetizable material which conduct the magnetic field of the magnet 16 to create a rotor magnetic field. The spacer 22 separates the inner pole piece 18 from the outer pole pieces 20 and air gaps 23 separate the outer pole pieces 20. The magnets 16 are generally cylindrical and parallel axial with a motor shaft 11, although other shapes of magnets might be used.

Figure 6A:
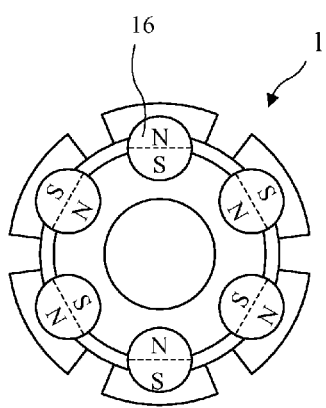
FIG. 6A is an end view of a tunable permanent magnet rotor according to the present invention, in the radially aligned configuration, with the permanent two pole magnets aligned for a maximum (or strong) magnetic field.
Figure 6B:
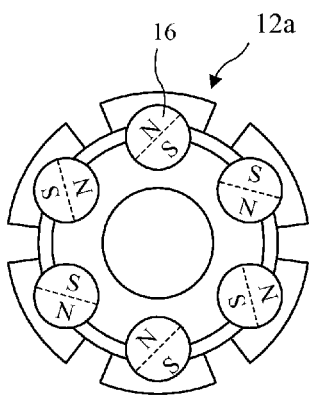
FIG. 6B is an end view of a tunable permanent magnet rotor according to the present invention, in a radially aligned configuration, with the permanent two pole magnets aligned for a medium magnetic field.
Figure 6C:
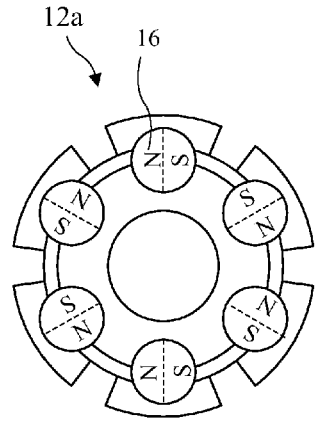
FIG. 6C is an end view of a tunable permanent magnet rotor according to the present invention, in the radially aligned configuration, with the permanent two pole magnets aligned for a minimum (or weak) magnetic field.

An end view of a tunable permanent magnet rotor 12a, with the permanent two pole magnets 16 aligned for a maximum (or strong) magnetic field 24a (see FIG. 7A) is shown in FIG. 6A, an end view of a tunable permanent magnet rotor 12a with the permanent two pole magnets 16 aligned for a medium magnetic field is shown in FIG. 6B, and an end view of a tunable permanent magnet rotor 12a, with the permanent two pole magnets 16 aligned for a minimum (or weak) magnetic field 24b (see FIG. 7B) is shown in FIG. 6C. In an electric motor, the alignment providing a strong magnetic field provides hi torque at low RPM and the alignment providing a weak magnetic field provides efficient operation at high RPM. In a generator, the output voltage may be adjusted by adjusting the magnet alignment allowing constant voltage in generators having varying RPM, such as automotive alternators and wind power generators.

Figure 7A:
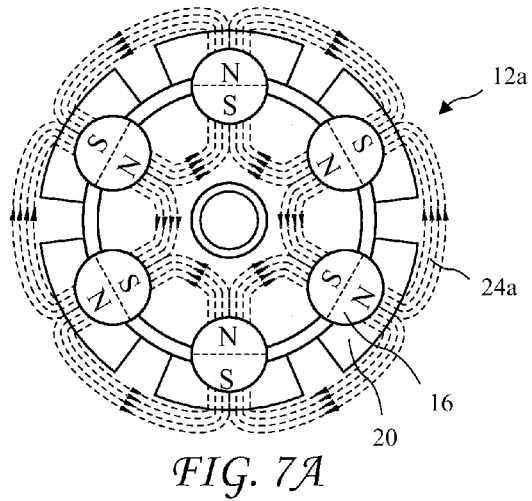
FIG. 7A shows the strong magnetic field corresponding to FIG. 6A.
Figure 7B:
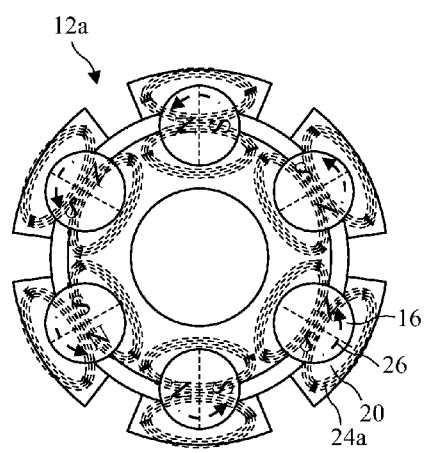
FIG. 7B shows the weak magnetic field corresponding to FIG. 6C.

The strong magnetic field 24a corresponding to FIG. 6A is shown in FIG. 7A and the weak magnetic field corresponding to FIG. 6C is shown in FIG. 7B.

Figure 8:
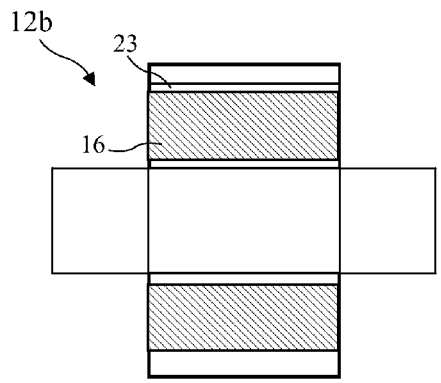
FIG. 8 is a side view of a tunable permanent magnet rotor according to the present invention, in a flux squeeze configuration.
Figure 9:
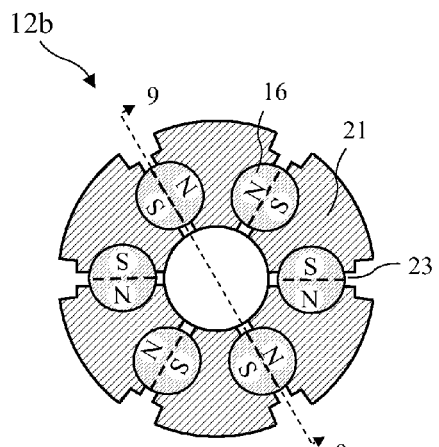
FIG. 9 is an end view of the tunable permanent magnet rotor according to the present invention, in the flux squeeze configuration.

A side view of a tunable permanent magnet rotor 12b according to the present invention, in a flux squeeze configuration, is shown in FIG. 8 and an end view of the tunable permanent magnet rotor 12b shown in FIG. 9. The rotor 12b includes the magnets 16, pole pieces 21, and air gaps 23. The pole pieces are a magnetically conducting but non-magnetizable material which conduct the magnetic field of the magnet 16 to create a rotor magnetic field. The air gaps 23 separate the pole pieces 21.

Figure 10B:
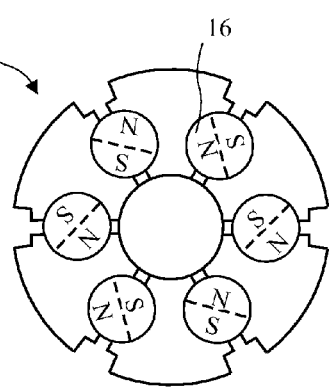
FIG. 10B is an end view of a tunable permanent magnet rotor according to the present invention, in a flux squeeze configuration, with the permanent two pole magnets aligned for a medium magnetic field.
Figure 10A:
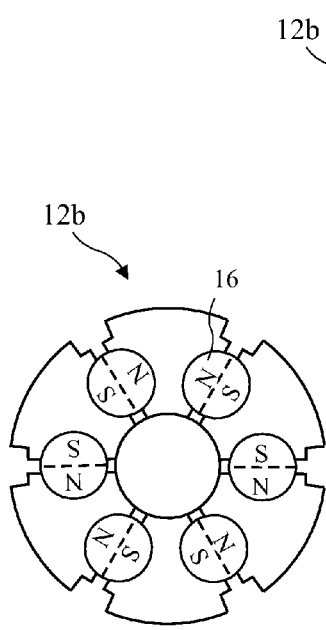
FIG. 10A is an end view of a tunable permanent magnet rotor according to the present invention, in the flux squeeze configuration, with the permanent two pole magnets aligned for a maximum (or strong) magnetic field.
Figure 10C:
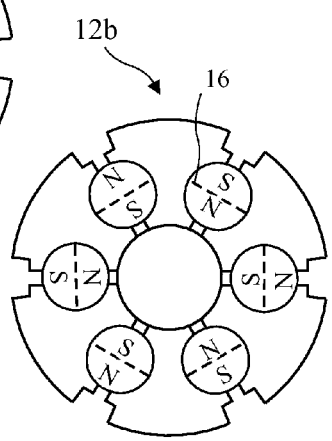
FIG. 10C is an end view of a tunable permanent magnet rotor according to the present invention, in the flux squeeze configuration, with the permanent two pole magnets aligned for a minimum (or weak) magnetic field.

An end view of a tunable permanent magnet rotor 12b, with the permanent two pole magnets 16 aligned for a maximum (or strong) magnetic field 24a' (see FIG. 11A) is shown in FIG. 10A, an end view of a tunable permanent magnet rotor 12b with the permanent two pole magnets 16 aligned for a medium magnetic field is shown in FIG. 10B, and an end view of a tunable permanent magnet rotor 12b, with the permanent two pole magnets 16 aligned for a minimum (or weak) magnetic field 24b' (see FIG. 11B) is shown in FIG. 10C. In an electric motor, the alignment providing a strong magnetic field provides hi torque at low RPM and the alignment providing a weak magnetic field provides efficient operation at high RPM. In a generator, the output voltage may be adjusted by adjusting the magnet alignment allowing constant voltage in generators having varying RPM, such as automotive alternators and wind power generators.

Figure 11A:
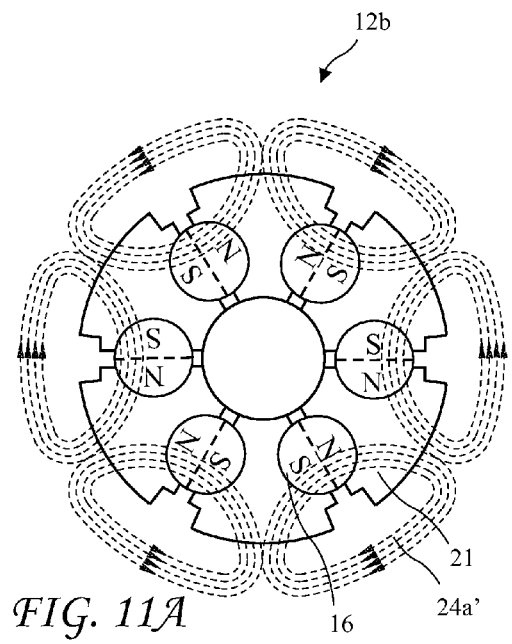
FIG. 11A shows the strong magnetic field corresponding to FIG. 10A.
Figure 11B:
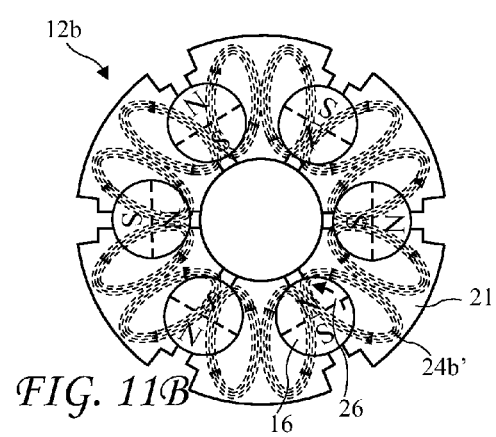
FIG. 11B shows the weak magnetic field corresponding to FIG. 10C.

The strong magnetic field 24a' corresponding to FIG. 10A is shown in FIG. 11A and the weak magnetic field corresponding to FIG. 10C is shown in FIG. 11B.

Figure 12:
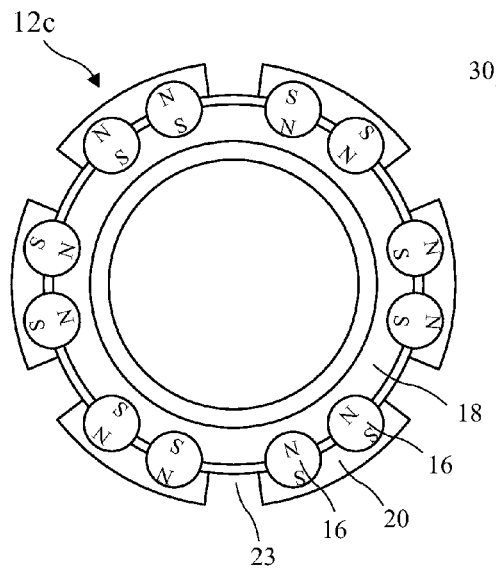
FIG. 12 is an end view of a tunable permanent magnet rotor according to the present invention, having pairs of the cylindrical two pole permanent magnets in the radially aligned configuration.
Figure 13:
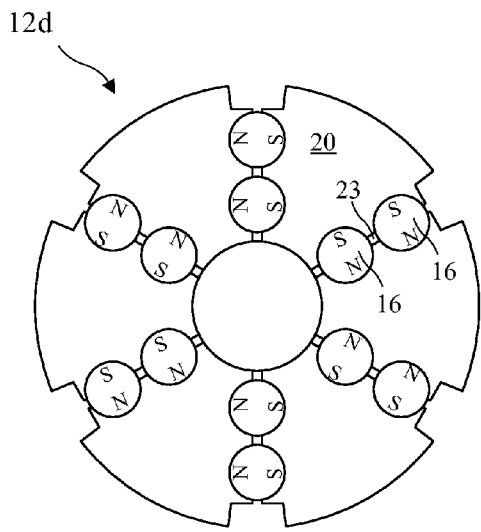
FIG. 13 is an end view of a tunable permanent magnet rotor according to the present invention, having pairs of the cylindrical two pole permanent magnets in the flux squeeze configuration.

An end view of a tunable permanent magnet rotor 12c according to the present invention, having pairs of the cylindrical two pole permanent magnets 16 in the radially aligned configuration is shown in FIG. 12 and an end view of a tunable permanent magnet rotor 12d according to the present invention, having pairs of the cylindrical two pole permanent magnets 16 in the flux squeeze configuration is shown in FIG. 13. The present invention is not limited to single or pairs of magnets, and any number of magnets may be grouped as appropriate for the application. For example, three, four, five, or more magnets may replace the pairs of magnets in FIGS. 12 and 13.

An end view of a hybrid rotor 12a' including tunable permanent internal magnets 16 and fixed external magnets 17, in the radially aligned configuration, according to the present invention, is shown in FIG. 14. The combination of the tunable permanent internal magnets 16 and fixed external magnets 17 allows additional design of the rotor magnetic field. An end view of the hybrid tunable permanent internal magnet and fixed external magnet rotor 12a', tuned for a maximum magnetic field, is shown in FIG. 15A and an end view of the hybrid tunable permanent internal magnet and fixed external magnet rotor 12a' tuned for a minimum magnetic field is shown in FIG. 15B.

An end view of a hybrid rotor 12b' including tunable permanent internal magnets 16 and fixed external magnets 17, in the flux squeeze configuration, according to the present invention, is shown in FIG. 16. The combination of the tunable permanent internal magnets 16 and fixed external magnets 17 allows additional design of the rotor magnetic field. An end view of the hybrid tunable permanent internal magnet and fixed external magnet rotor 12b', tuned for a maximum magnetic field, is shown in FIG. 17A and an end view of the hybrid tunable permanent internal magnet and fixed external magnet rotor 12b' tuned for a minimum magnetic field is shown in FIG. 15B.

Figure 18A:
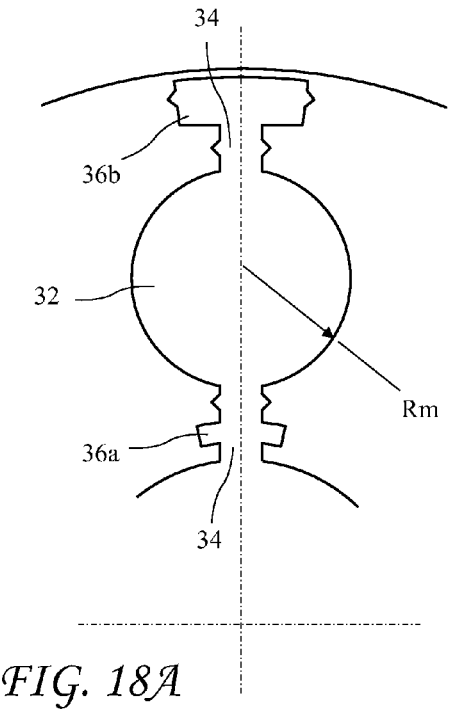
FIG. 18A is a detail 18A of FIG. 18.
Figure 18:
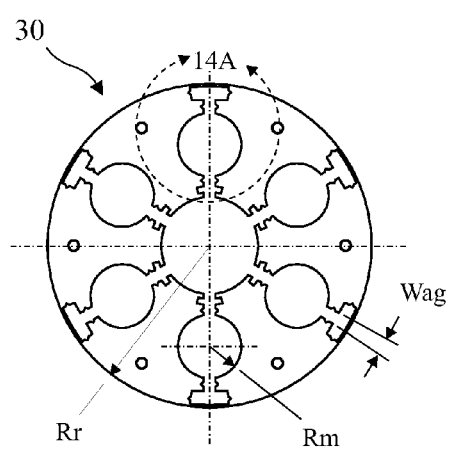
FIG. 18 is an end view of an element for constructing a laminated pole piece according to the present invention.

An end view of an element 30 for constructing a laminated pole piece is shown in FIG. 18 and detail 18A of FIG. 18 is shown in FIG. 18A. Rotors are often constructed from laminating a multiplicity of elements 30, each element 30 is preferably coated by an electrical insulation. The element 30 has radius Rr, round cutouts 32 for the cylindrical magnets 16 having a radius Rm, and air gaps having a width Wag 34. Laminated pole pieces for other embodiments of the present invention are similarly constructed.

A side view of a first embodiment of apparatus 40a for adjusting the cylindrical two pole permanent magnets 16 in a first magnet position is shown in FIG. 19A, an end view of the apparatus 40a for adjusting the cylindrical two pole permanent magnets in the first magnet position is shown in FIG. 19B, a side view of the apparatus 40a for adjusting the cylindrical two pole permanent magnets 16 in a second magnet position is shown in FIG. 20A, and an end view of the apparatus 40a for adjusting the cylindrical two pole permanent magnets in the second magnet position is shown in FIG. 20B. The apparatus for adjusting 40a includes a linear motor 42 which is preferably a stepper motor, a shaft 48 actuated axially by the linear motor 42, and ring 46 axially actuated by the shaft 48, and an arm (or arms) 44 actuated by the ring 46 and connected to one of six toothed racks 52. The toothed racks 52 engaged gears 50 attached to the magnets 16 to rotate the magnets 16. Actuation of the shaft 48 to the right pulls the toothed rack 52 radially in and actuation of the shaft 48 to the left pushed the toothed rack 52 radially out, thereby directly rotating the magnets with gears 50 directly engaging the toothed rack 52, and the remaining magnets 16 are coupled to the actuation by the toothed racks between the adjacent gears 50.

A side view of a second embodiment of apparatus 40b for adjusting the cylindrical two pole permanent magnets 16 in a first magnet position is shown in FIG. 21A, an end view of the apparatus 40b for adjusting the cylindrical two pole permanent magnets in the first magnet position is shown in FIG. 21B, a side view of the apparatus 40b for adjusting the cylindrical two pole permanent magnets 16 in a second magnet position is shown in FIG. 22A, and an end view of the apparatus 40b for adjusting the cylindrical two pole permanent magnets in the second magnet position is shown in FIG. 22B. The apparatus for adjusting 40b includes the linear motor 42 which is preferably a stepper motor, a shaft 48 actuated axially by the linear motor 42, and ring 46 axially actuated by the shaft 48, and a bent elbow 45 actuated by the ring 46 and connected to one of six toothed racks 52. The bent elbow 45 is biased to a bent position, for example, with a 90 degree bend. When the ring 46 moves to the right to release the bent elbow 45, the bent elbow 45 relaxes to the bent position and pulls the toothed rack 52 radially in. When the ring 46 moves to the left to exert force on the bent elbow 45, the bent elbow 45 straightens and pushes the toothed rack 52 radially out. The toothed racks 52 engaged gears 50 attached to the magnets 16 to rotate the magnets 16. Actuation of the linear motor 42 to the right thus pulls the toothed rack 52 radially in and actuation of the linear motor 42 to the left pushed the toothed rack 52 radially out, thereby directly rotating the magnets 16 with gears 50 directly engaging the toothed rack 52, and the remaining magnets 16 are coupled to the actuation by the toothed racks 52 between the adjacent gears 50.

A side view of a third embodiment of apparatus 40c for adjusting the cylindrical two pole permanent magnets 16 in a first magnet position is shown in FIG. 23A, an end view of the apparatus 40c for adjusting the cylindrical two pole permanent magnets in the first magnet position is shown in FIG. 23B, a side view of the apparatus 40c for adjusting the cylindrical two pole permanent magnets 16 in a second magnet position is shown in FIG. 24A, and an end view of the apparatus 40c for adjusting the cylindrical two pole permanent magnets in the second magnet position is shown in FIG. 24B. The apparatus for adjusting 40c includes the linear motor 42 which is preferably a stepper motor, a shaft 48 actuated axially by the linear motor 42, a first piston 47 connected to the shaft 48 and a second piston 49 in fluid communication with the piston 47 and connected to one of the six toothed racks 52. When the piston 47 moves to the right the second piston 49 is drawn radially in and the toothed rack 52 is pulled radially in. When the ring 46 moves to the left the piston 47 moves to the left and the piston 49 moves radially out and pushes the toothed rack 52 radially out. The toothed racks 52 engaged gears 50 attached to the magnets 16 to rotate the magnets 16. Actuation of the linear motor 42 to the right thus pulls the toothed rack 52 radially in and actuation of the linear motor 42 to the left pushed the toothed rack 52 radially out, thereby directly rotating the magnets 16 with gears 50 directly engaging the toothed rack 52, and the remaining magnets 16 are coupled to the actuation by the toothed racks 52 between the adjacent gears 50.

Additional gear apparatus according to the present invention for adjusting the positions of the cylindrical two pole internal permanent magnets 16 of the hybrid tunable permanent internal magnet and fixed external magnet rotor, in the radially aligned configuration, is shown in FIG. 25A. Small magnet gears 50 are fixed to an end of each magnet 16. A large center gear 51 engages each of the small magnet gears 50 and causes each of the magnets 16 to maintain approximately (some gear lash may exist as long as the magnets are closely aligned) the same alignment and may be turned to adjust the alignment of the magnets 16 from the weak field to the strong field.

Additional gear apparatus for adjusting the positions of the cylindrical two pole internal permanent magnets of the hybrid tunable permanent internal magnet and fixed external magnet rotor, in the flux squeeze configuration, according to the present invention is shown in FIG. 25B. A small center gear 51a engages only alternate ones of the small magnet gears 50, and the small gears 50 engage each adjacent gear 50, and causes each of the magnets 16 to maintain approximately (some gear lash may exist as long as the magnets are closely aligned) the same alignment and may be turned to adjust the alignment of the magnets 16 from the weak field to the strong field.

A side view of a biasing system for controlling magnet positions for a motor according to the present invention is shown in FIG. 26A and an end view of the biasing system for controlling magnet positions for the motor through wires 70 is shown in FIG. 26B. A control 64 converts single phase DC voltage from a source 68 to three phase trapezoidal or sinusoidal wave form for a three phase motor. One DC input line to a field coil 60 used to create an electromagnetic field proportional to a load on the motor. The field coil 60 has very low resistance and does not reduce input voltage to the motor or increase resistance appreciably. The field acts on a disk 62 and pushes the disk to the left against the bent elbow 45 to rotate the magnets 16.

As the motor load increases, the electromagnetic field is increased proportionally with load, the calibrated load is just slightly less than required to overpower the rotation of the magnets 16, the tipping circuit 66 is a shunting controller which provides a small current that added to the electromagnetic force of the bias armature 62 provides the final force to control the rotation of magnets 16 which controls the magnetic field of the rotor. The controller 64 is preferably an inverter type which converts single phase DC to a three phase wave form which energizes the stator fields to rotate the rotor.

The biasing actuator comprises the ultra low resistance coil 60 and armature 62 which produces force proportional to the load current that forces against the inherent nature of magnets 16 to rest in the weak magnetic field position. The tipping circuit 66 is a low force trigger control that contributes an extra current to the biasing actuator which can rotate the magnets 16 to adjust magnetic field to either strong or weak positions using very little electrical power.

Figure 27A:
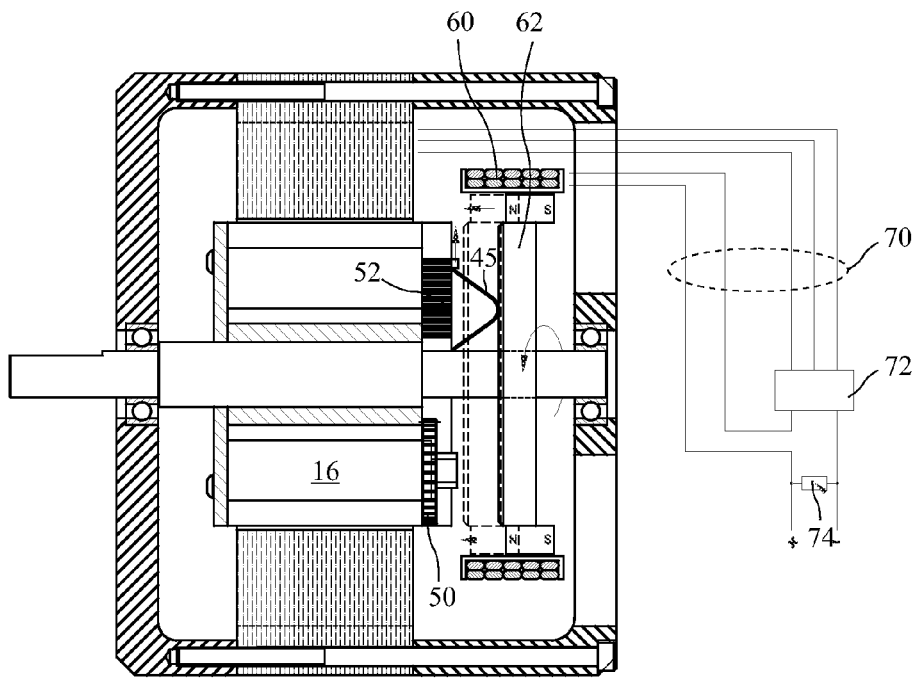
FIG. 27A is a side view of a biasing system for controlling magnet positions for a generator according to the present invention.
Figure 27B:
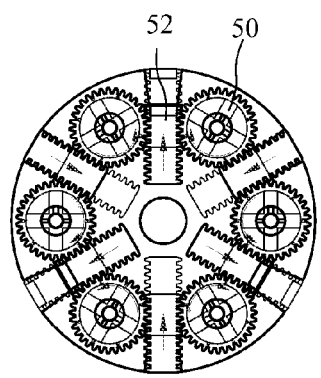
FIG. 27B is an end view of the biasing system for controlling magnet positions for a generator according to the present invention.

A side view of a biasing system for controlling magnet 16 positions for a generator according to the present invention is shown in FIG. 27A and an end view of the biasing system for controlling magnet 16 positions for a generator is shown in FIG. 27B. The generator may be driven to create the phase, or any phase, of power as a generator/alternator.

The output of generator/alternator phase power is generally passed through a six diode array 72 which converts the multi phase currents to single phase DC. The output of one of the output DC lines are diverted into the low resistance biasing coil 60 and armature 62 which create an opposing force against the natural rotation of the magnets 16 to the weak field position. In the same fashion as the motor configuration of FIGS. 26A and 26B, the tipping control provides the little extra current to the coil 60 and armature 62 to overcome magnetic force to control the position of rotation of magnets and magnetic field. The tipping circuit controller is an electronic transistor type switch which can provide a variable amount of power to be added to the biasing force of the coil 60 and armature 62.

Figure 28A:
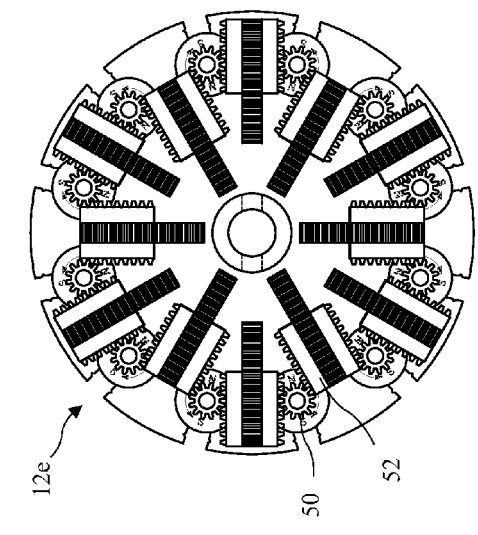
FIG. 28A is a side view of a tunable permanent magnet rotor according to the present invention having rotatable half length cylindrical magnets and co-axial fixed half length cylindrical magnets and a biasing system for controlling magnet positions.
Figure 28B:
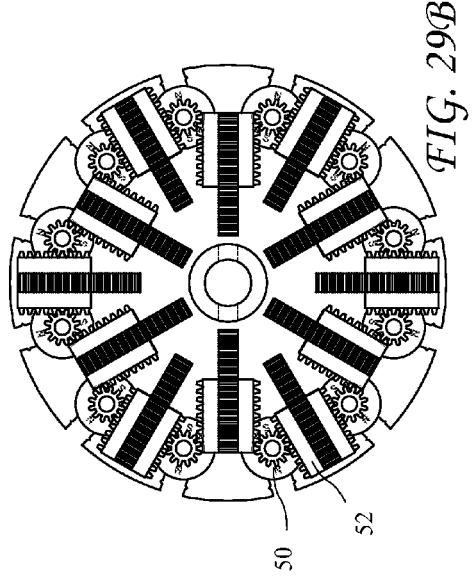
FIG. 28B is a front view of a tunable permanent magnet rotor according to the present invention having rotatable half length cylindrical magnets and co-axial fixed half length cylindrical magnets and the biasing system for controlling magnet positions taken along line 28B-28B of FIG. 28A.
Figure 29A:
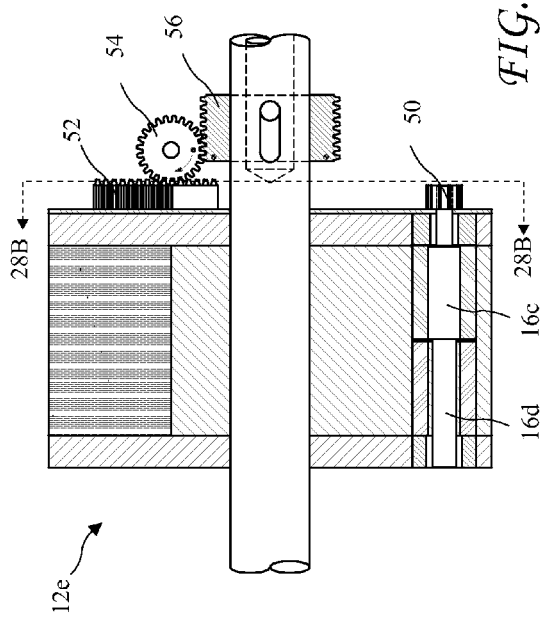
FIG. 29A is a side view of a rotor having rotatable half length cylindrical magnets and co-axial fixed half length cylindrical magnets and a biasing system for controlling magnet positions.
Figure 29B:
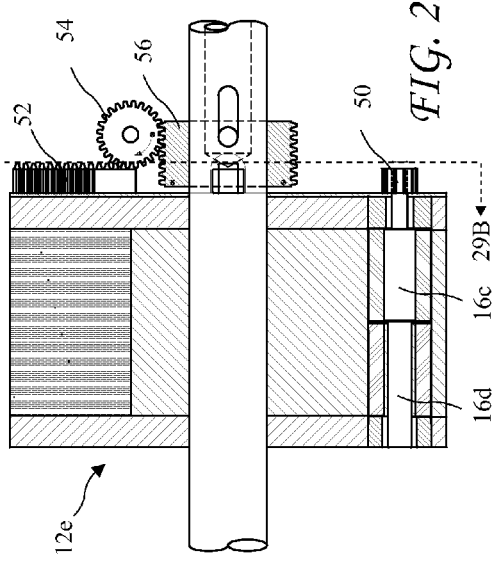
FIG. 29B is a front view of the rotor having rotatable half length cylindrical magnets and co-axial fixed half length cylindrical magnets and the biasing system for controlling magnet positions.

A side view of a tunable permanent magnet rotor 12e according to the present invention having rotatable half length cylindrical magnets 16c in an aligned orientation and co-axial fixed half length cylindrical magnets 16d, and an adjusting system for controlling magnet positions, is shown in FIG. 28A, and a cross-sectional view of a tunable permanent magnet rotor 12e taken along line 28B-28B of FIG. 28A is shown in FIG. 28B. A second side view of the rotor 12e with the rotatable half length cylindrical magnets 16c misaligned with the co-axial fixed half length cylindrical magnets 16d is shown in FIG. 29A, and a cross-sectional view of a tunable permanent magnet rotor 12e taken along line 29B-29B of FIG. 29A is shown in FIG. 29B. When the magnets 16c and 16d are aligned (i.e., the poles of the magnets 16c and 16d are aligned) a strong magnetic field is created, and when the magnets 16c are rotated 180 degrees and the poles of the magnets 16c and 16d are misaligned, a week magnetic field results.

The adjusting system comprises pinion gears 52 attached to the magnets 16c, radially sliding rack gears 52 cooperating with the pinion gears 50, and with second pinion gears 54, and axially sliding rack gears 56 cooperating with the second pinion gears 54. The axially sliding rack gears 56 may be actuated electrically using a solenoid, hydraulically (see FIGS. 23A-24B), by linear motor, by linear stepper motor, by levers, or by any means to move the axially sliding rack gears 56 in an axial direction. The axial translation of the axially sliding rack gears 56 is coupled to the second pinion gears 54 to rotate the second pinion gears 54. The rotation of the second pinion gears 54 is coupled to the radially sliding rack gears 52 to move the radially sliding rack gears 52 radially. The radial motion of the radially sliding rack gears 52 is coupled to the first pinion gears 50 to rotate the first pinion gears 50 to rotate the magnets 16c to align and miss-align the magnets 16c with the magnets 16d to selectively create strong and weak magnetic fields.

An end view of a tunable permanent magnet rotor 12f according to the present invention, having moveable magnetic shunting pieces 80 and fixed external permanent magnets 17 and fixed internal permanent magnets 16e aligned to provide a strong magnetic field is shown in FIG. 30A and an end view of the tunable permanent magnet rotor 12f, having moveable magnetic shunting pieces 80 rotated and misaligned with the fixed permanent magnets 17 and 16e to provide a weak magnetic field is shown in FIG. 30B. The moveable magnetic shunting pieces 80 are preferably cylindrical and made of a magnetically conductive non-magnetizable material and include a bar 80a through the center of the moveable magnetic shunting pieces 80 separating the moveable magnetic shunting pieces 80 into two parts. The bar 80a is made of a non-magnetically conducting material and preferably of a non-ferrous non-magnetic material. The moveable magnetic shunting pieces 80 may be moved (or adjusted) using any of the adjusting systems described for moving the magnets as described herein, and any motor or generator using moveable shunting pieces to alter the magnetic field from a strong magnetic field to a weak magnetic field is intended to come within the scope of the present invention.

An end view of the tunable permanent magnet rotor 12f showing the strong magnetic field 24a'' obtained by having the moveable magnetic shunting pieces aligned with the magnets 16e is shown in FIG. 31A and an end view of the tunable permanent magnet rotor 12f showing the weak magnetic field 24b'' obtained by having the moveable magnetic shunting pieces misaligned with the magnets 16e is shown in FIG. 31A. Various other embodiments of rotors including magnetically conducting circuits having moveable magnetic shunting pieces will be apparent to those skilled in the art, for example, a cylindrical shell outside the magnets with angularly alternating magnetically conducting and non-conducting segments, and any rotor used in a motor or generator having such moveable magnetic shunting piece(s) cooperating the magnets to selectively create a strong and a weak magnetic field is intended to come within the scope of the present invention.

While the invention herein disclosed has been described by means of specific embodiments and applications thereof, numerous modifications and variations could be made thereto by those skilled in the art without departing from the scope of the invention set forth in the claims.

We claim:

1. A cooperating rotor and stator assembly for use in an electric motor or generator converting between electrical and mechanical power, the rotor and stator assembly comprising:
   a fixed stator having electrical stator windings;

a rotating rotor residing inside the stator and including a magnetically conducting circuit including comprising:
fixed pole pieces made from magnetically conducting non-magnetizable material; and
a plurality of moveable members selected from the group consisting of moveable magnetic shunting pieces made from the magnetically conducting non-magnetizable material, and permanent magnets, the moveable members moveable to selectively create a strong rotor magnetic field and a weak rotor magnetic field.

2. The rotor and stator assembly of claim 1, wherein the plurality of moveable elements comprises the moveable magnetic shunting pieces comprising pairs of angularly spaced apart magnetically conducting members extending axially in the rotor, the moveable magnetic shunting pieces residing radially outward from the permanent magnets, the shunting piece movable to align a gap between the spaced apart magnetically conducting members radially to conduct the magnetic field radially through the spaced apart magnetically conducting members to create the strong rotor magnetic field, and to rotate the shunting piece to align the spaced apart magnetically conducting members to short out the magnetic field to create the weak rotor magnetic field.

3. The rotor and stator assembly of claim 2, further including a plurality of angularly spaced apart fixed external magnets residing on the surface of the rotor and separated by gaps, the gaps radially aligned outward from the moveable magnetic shunting pieces and the gaps radially outward from the permanent magnets.

4. The rotor and stator assembly of claim 1, wherein:
the moveable members comprise rotatable cylindrical permanent magnets; and
the fixed pole pieces are in a radially aligned configuration having the rotatable cylindrical permanent magnets rotatably held between an inner pole piece extending axially in the rotor and outer pole pieces extending axially.

5. The rotor and stator assembly of claim 4, wherein the outer pole pieces are angularly spaced apart and one of the outer pole pieces resides over each of the rotatable cylindrical permanent magnets.

6. The rotor and stator assembly of claim 5, wherein the outer pole pieces define a cylindrical outer surface of the rotor.

7. The rotor and stator assembly of claim 6, wherein:
the inner pole piece defines a cylinder with spaced apart outer rounded notches on an outer surface, the rotatable cylindrical permanent magnets resting in the outer rounded notches; and
each outer pole piece defines an inner cylindrical arc with an inner rounded notch on the inner cylindrical arc, the rotatable cylindrical permanent magnets resting under the inner rounded notches.

8. The rotor and stator assembly of claim 1, wherein:
the moveable members comprise rotatable cylindrical permanent magnets; and
the pole pieces are in a flux squeeze configuration, the rotatable cylindrical permanent magnets rotatably held between angularly spaced apart pole pieces.

9. The rotor and stator assembly of claim 8, wherein the pole pieces define a cylindrical outer surface of the rotor.

10. The rotor and stator assembly of claim 9, wherein:
each pole piece include wedged shaped sides, an arced inner face, and an arced outer face defining the cylindrical outer surface of the rotor; and
each side includes a rounded notch, the rotatable cylindrical permanent magnets residing between facing pairs of the notches.

11. The rotor and stator assembly of claim 9, wherein the rotatable cylindrical permanent magnets are coaxial with the rotor and continuously extend the length of the rotor.

12. The rotor and stator assembly of claim 1, wherein the moveable element comprises at least one moveable permanent magnet in magnetic cooperation with the pole pieces, the at least one permanent magnet moveable to adjust the rotor magnetic field to a strong magnetic field and to a weak magnetic field.

13. The rotor and stator assembly of claim 12, further including magnet gears attached to ends of each of the rotatable permanent magnets to adjust the alignment of each of the rotatable permanent magnets.

14. The rotor and stator assembly of claim 13, wherein sliding toothed racks cooperate with corresponding ones of the magnet gears to adjust the alignment of each of the rotatable permanent magnets.

15. The rotor and stator assembly of claim 14, wherein a straight lever connects to at least one of the toothed racks and the lever is actuated to slide the toothed racks radially to adjust the alignment of each of the rotatable permanent magnets.

16. The rotor and stator assembly of claim 15, wherein the straight lever is actuated by a linear actuator to slide the toothed racks radially to adjust the alignment of each of the rotatable permanent magnets.

17. The rotor and stator assembly of claim 16, wherein the linear actuator is a stepper motor.

18. The rotor and stator assembly of claim 14, wherein one end of a bent elbow connects to at least one of the toothed racks and the bent elbow is opened and closed to slide the toothed racks radially to adjust the alignment of each of the rotatable permanent magnets.

19. The rotor and stator assembly of claim 18, wherein:
a peak of the bent elbow resides against a sliding piece; and
axial translation of the sliding piece towards the bent elbow opens the bent elbow and translation of the sliding piece away from the bent elbow closes the bent elbow, to slide the toothed racks radially to adjust the alignment of each of the rotatable permanent magnets.

20. The rotor and stator assembly of claim 19, wherein the bent elbow actuated by a linear actuator to slide the toothed racks radially to adjust the alignment of each of the rotatable permanent magnets.

21. The rotor and stator assembly of claim 14, wherein a hydraulic piston is actuated to slide the toothed racks radially to adjust the alignment of each of the rotatable permanent magnets.

22. The rotor and stator assembly claim 21, wherein the hydraulic piston is in fluid communication with a second hydraulic piston and actuation of the second hydraulic piston causes translation of the hydraulic piston and caused the toothed racks to adjust the alignment of each of the rotatable permanent magnets.

23. The rotor and stator assembly of claim 22, wherein the second hydraulic piston is actuated by a linear actuator.

24. The rotor and stator assembly of claim 13, wherein a single center gear cooperates with each of the magnet gears to maintain approximately the same alignment of each of the rotatable permanent magnets.

25. An electric motor comprising:
a stator having electrical stator windings;
a rotating stator magnetic field created by electrical current running through the stator windings;

a rotor residing inside the stator windings, the rotor comprising:
fixed pole pieces made from magnetically conducting non-magnetizable material; and
a plurality of cylindrical internal permanent magnets in magnetic cooperation with the pole pieces, the cylindrical internal permanent magnets extending axially the length of the rotor and rotatable to adjust a rotor magnetic field to a strong magnetic field and to a weak magnetic field.

26. An electric motor or generator comprising:
a stator having electrical stator windings;
a rotatable rotor residing inside the stator windings, the rotor comprising:
fixed pole pieces made from magnetically conducting non-magnetizable material;
a plurality of fixed magnets extending axially the length of the rotor; and
a plurality of moveable magnetic shunting pieces including magnetically non-conducting material cooperation with the at least one fixed magnet and the pole pieces, the magnetic shunting pieces rotatable to adjust a rotor magnetic field to a strong magnetic field and to a weak magnetic field.

* * * * *